Dec. 2, 1930 — R. F. COWELL — 1,783,410
SHOCK INSULATED UNION AND PIPE STRAP
Filed Oct. 2, 1928
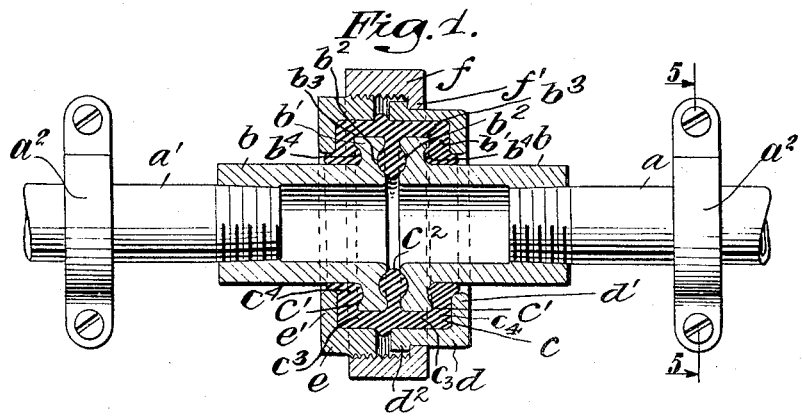
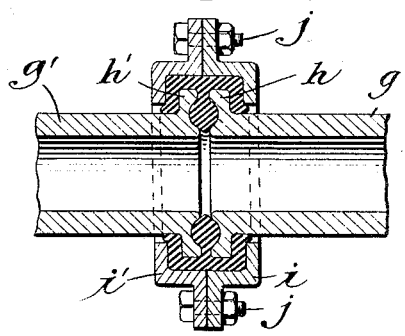
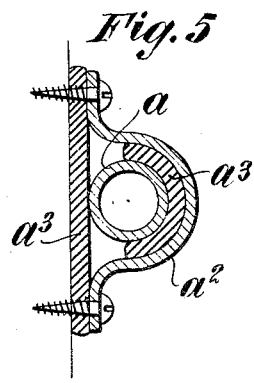
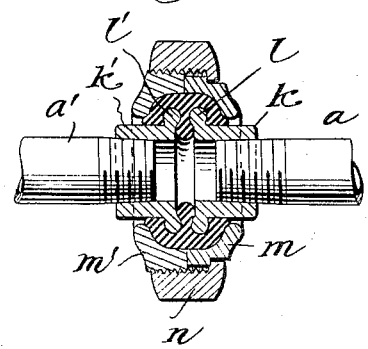
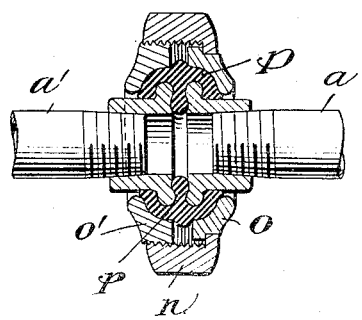
INVENTOR:
Robert F. Cowell
BY Redding, Greeley, O'Shea & Campbell
his ATTORNEYS.

Patented Dec. 2, 1930

1,783,410

UNITED STATES PATENT OFFICE

ROBERT F. COWELL, OF TEANECK, NEW JERSEY, ASSIGNOR TO INTERNATIONAL MOTOR COMPANY, OF NEW YORK, N. Y., A CORPORATION OF DELAWARE

SHOCK INSULATED UNION AND PIPE STRAP

Application filed October 2, 1928. Serial No. 309,726.

The present invention relates to devices for connecting pipe sections in a manner to impart flexibility to the connected portions without destroying the tightness of the connections. In existing constructions which permit relative movement between pipe sections, no provisions is made for resisting relative movement of the sections yieldingly and, in many instances, this characteristic is highly desirable.

An object of the present invention is to provide a means for connecting pipe sections in a manner to prevent the transmission of vibrations therebetween, the specific construction comprising a connection which eliminates any metal to metal contact between the pipe sections. It is further contemplated to provide a connection of the above character which will be fluid tight, permanent, and easily applied.

Further objects will appear as the description of the invention proceeds and reference will now be had to the accompanying drawings, wherein:

Figure 1 is a view, in section, showing a pipe connection constructed in accordance with the present invention.

Figure 2 is a view similar to Figure 1 of a modified form of connection.

Figure 3 is a view, in section, of a further modification of the invention.

Figure 4 is a view showing a form similar to Figure 3 but with the elements thereof slightly changed.

Figure 5 is a view, in section, taken on line 5—5 of Figure 1, and looking in the direction of the arrows.

Referring to the above drawings, $a$, $a'$ designate the ends of adjacent pipe sections to be connected. These pipe sections are connected to the supporting structure through pipe straps $a^2$. Between the pipe and the strap and support, are positioned non-metallic yielding strips $a^3$, preferably formed of rubber. Threaded on each of these sections are fittings $b$ provided with annular peripheral flanges $b'$. As clearly shown these flanges are provided with a slightly flared periphery to constitute a more effective securing means.

About the ends of fittings $b$ a non-metallic yielding annular element $c$ is mounted, the latter being provided with internal grooves $c'$ for receiving the flanges $b'$. Separating the grooves $c'$ is a rib $c^2$ which lies between the flanges $b'$ and prevents the latter from coming into direct contact. The block has a portion $c^2$ adapted to lie between the adjacent faces $b^2$ of the peripheral flanges, portions $c^3$ overlying the edges $b^3$ of the flanges, and portions $c^4$ lying along the non-adjacent faces $b^4$ of the flanges.

Sleeves $d$ and $e$ are formed with flanges $d'$ and $e'$, respectively, and nut $f$ causes these flanges to confine the non-metallic material and associated elements in direct engagement. Nut $f$ is threaded on sleeve $e$ and provided with a flange $f'$ which engages a cooperating flange $d^2$ on the sleeve $d$. It will be seen that the non-metallic yielding material, which is preferably a block of rubber, may be secured in any desired degree of compression to afford a joint of great strength.

In the form shown in Figure 2, the yielding material is formed substantially the same as that shown in Figure 1. Fittings $b$ are eliminated and the pipe sections $g$ and $g'$ are formed with flanges $h$ and $h'$. Sleeves $i$ and $i'$ are connected by means of bolts $j$ and the resulting connection is substantially the same as described in Figure 1.

In Figure 3, pipe sections $a$ and $a'$ carry fittings $k$ and $k'$ which are formed with flanges $l$ and $l'$, the latter being rounded to afford a bearing surface which will not cut the non-metallic yielding material. Sleeves $m$ and $m'$ are formed with rounded portions to engage the block of yielding non-metallic material and nut $n$ secures the sleeves together in the same manner as nut $f$ in Figure 1.

Figure 4 is a highly modified form of the construction shown in Figure 3 and includes sleeves $o$ and $o'$ which are normally spaced apart to permit nut $n$ to be adjusted from time to time to increase or decrease the compression upon the yielding non-metallic block $p$.

From the foregoing description it will be apparent that the pipe sections are effectively secured together in a manner such that stresses set up in one section will be cushioned from adjacent sections without impairing the fluid tight connection therebetween. In addition to being insulated from one another, the sections are insulated from the supporting structure, thus completely isolating the stresses and strains placed upon the individual sections. Although the invention has been described in connection with the figures shown herein, it is not to be limited, save as defined in the appended claim.

I claim as my invention:

A resilient cushioning coupling for connecting pipe sections comprising juxtaposed flanges carried by the pipe sections, spaced annular grooves in the flanges, an annular block of yielding non-metallic material, annular grooves on the inner periphery of the block for receiving the juxtaposed flanges, clamping sections receiving the block to secure the block and flanges together, and means to secure the clamping sections together comprising a retaining nut surrounding and operatively engaging the two sections.

This specification signed this 26th day of September, A. D. 1928.

ROBERT F. COWELL.